(12) United States Patent
Gong et al.

(10) Patent No.: US 9,479,067 B2
(45) Date of Patent: Oct. 25, 2016

(54) SYSTEM AND METHOD FOR A SWITCHED-MODE POWER SUPPLY

(71) Applicant: Infineon Technologies Austria AG, Villach (AT)

(72) Inventors: Xiao Wu Gong, Singapore (SG); Yong Siang Teo, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 27 days.

(21) Appl. No.: 14/242,484

(22) Filed: Apr. 1, 2014

(65) Prior Publication Data

US 2015/0280584 A1 Oct. 1, 2015

(51) Int. Cl.
*H02J 3/12* (2006.01)
*G05F 1/00* (2006.01)
*H02M 3/335* (2006.01)
*H02M 1/00* (2006.01)

(52) U.S. Cl.
CPC ..... *H02M 3/33515* (2013.01); *H02M 3/33592* (2013.01); *H02M 2001/0048* (2013.01); *Y02B 70/1475* (2013.01); *Y02B 70/1491* (2013.01)

(58) Field of Classification Search
CPC ........ G05F 1/562; G05F 1/563; H02M 1/08; H02M 1/081; H02M 1/082; H02M 1/083; H02M 1/084; H02M 1/0845; H02M 3/335; H02M 3/33515; H02M 3/33592
USPC ........ 323/242, 274; 363/21.06, 21.08, 21.14, 363/21.16, 78
See application file for complete search history.

(56) References Cited

U.S. PATENT DOCUMENTS

| | | | |
|---|---|---|---|
| 8,611,109 B2 | 12/2013 | Roessler et al. | |
| 2008/0239773 A1 | 10/2008 | Yang | |
| 2009/0244942 A1 | 10/2009 | Huang | |
| 2009/0273951 A1* | 11/2009 | Ren | H02M 3/33592 363/21.06 |
| 2012/0020123 A1 | 1/2012 | Hsu | |
| 2014/0192575 A1* | 7/2014 | Olivik | H02M 3/33592 363/89 |
| 2014/0204624 A1* | 7/2014 | Djenguerian | H02M 3/33523 363/21.12 |
| 2014/0254202 A1* | 9/2014 | Balakrishnan | H03K 5/084 363/16 |
| 2014/0268915 A1* | 9/2014 | Kong | H02M 3/33592 363/21.14 |

FOREIGN PATENT DOCUMENTS

DE 102011083884 A1 4/2012

OTHER PUBLICATIONS

"FAN6204—Synchronous Rectification Controller for Flyback and Forward Freewheeling Rectification," Fairchild Semiconductor Corp., AN-6204, www.fairchildsemi.com, Rev. 1.0.2, Jan. 24, 2013, 8 pgs.

(Continued)

*Primary Examiner* — Adolf Berhane
*Assistant Examiner* — Gary Nash
(74) *Attorney, Agent, or Firm* — Slater Matsil, LLP (57) ABSTRACT

In accordance with an embodiment, a method of operating a switched-mode power supply includes detecting a voltage decrease in a secondary winding of a transformer by detecting a first voltage transient using a sensor capacitively coupled to the secondary winding of the transformer. A secondary switch coupled to the secondary winding of the transformer is turned on based on when the first voltage transient is detected.

25 Claims, 8 Drawing Sheets

(56) References Cited

OTHER PUBLICATIONS

"FSEZ1317—Primary-Side-Regulation PWM with Power MOSFET Integrated," Fairchild Semiconductor Corp., Power Supply WebDesigner, www.fairchildsemi.com, Rev. 1.0.5, Jan. 2011, 17 pgs.

"GreenChip synchronous rectifier controller," TEA1792TS, NXP Semiconductors, Product data sheet, Rev. 3, Jan. 29, 2014, 13 pgs.

* cited by examiner

SYSTEM AND METHOD FOR A SWITCHED-MODE POWER SUPPLY

TECHNICAL FIELD

The present disclosure relates generally to an electronic device, and more particularly to a system and method for a switched mode power supply.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

A SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

One application of an SMPS is a charger for a lithium ion battery. Since lithium-ion batteries are prone to damage if an upper voltage limit is exceeded, it is common to charge the battery with a constant current until the output voltage reaches a target voltage. As result, such a battery charger may utilize a SMPS that is configured to provide a constant current. Because such battery chargers may convert AC current from a wall socket to a DC current, flyback converters that use a transformer are commonly used to provide galvanic isolation from the AC mains to the battery being charged.

SUMMARY OF THE INVENTION

In accordance with an embodiment, a method of operating a switched-mode power supply includes detecting a voltage decrease in a secondary winding of a transformer by detecting a first voltage transient using a sensor capacitively coupled to the secondary winding of the transformer. A secondary switch coupled to the secondary winding of the transformer is turned on based on when the first voltage transient is detected.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a switched-mode power supply in a flyback configuration. Embodiments of the present invention may also be applied to other switched-mode power supply configurations and other systems and applications including other circuits that switch including, but not limited to power systems and motor control systems.

In an embodiment of the present invention, a secondary side synchronous rectifier controller is implemented using a sensor that is capacitively coupled to the secondary winding of a transformer in a switched-mode power supply. A secondary side switch coupled to the secondary winding is activated when a transient is detected by the sensor. This transient may correspond to a transient caused by a switch coupled to the primary side of the transformer as the switch is being opened.

In an embodiment, a clamping circuit is coupled to an input of the sensor. Thus, an activation of the secondary side switch as a result of the primary side switch turning on may be prevented if a current through the clamping current is sensed at the same time that the sensor detects a voltage transient on the secondary winding. In some embodiments, a secondary switch shutoff time is determined by measuring a demagnetization time of the secondary winding and shutting off the secondary side switch based on a demagnetization time of a previous cycle. In some cases, the timing of the secondary side switch may include dead zones that prevent the secondary side switch from turning on at the same time as the primary side switch. These dead zones may be implemented using delay circuits and counters.

Figure 1A:
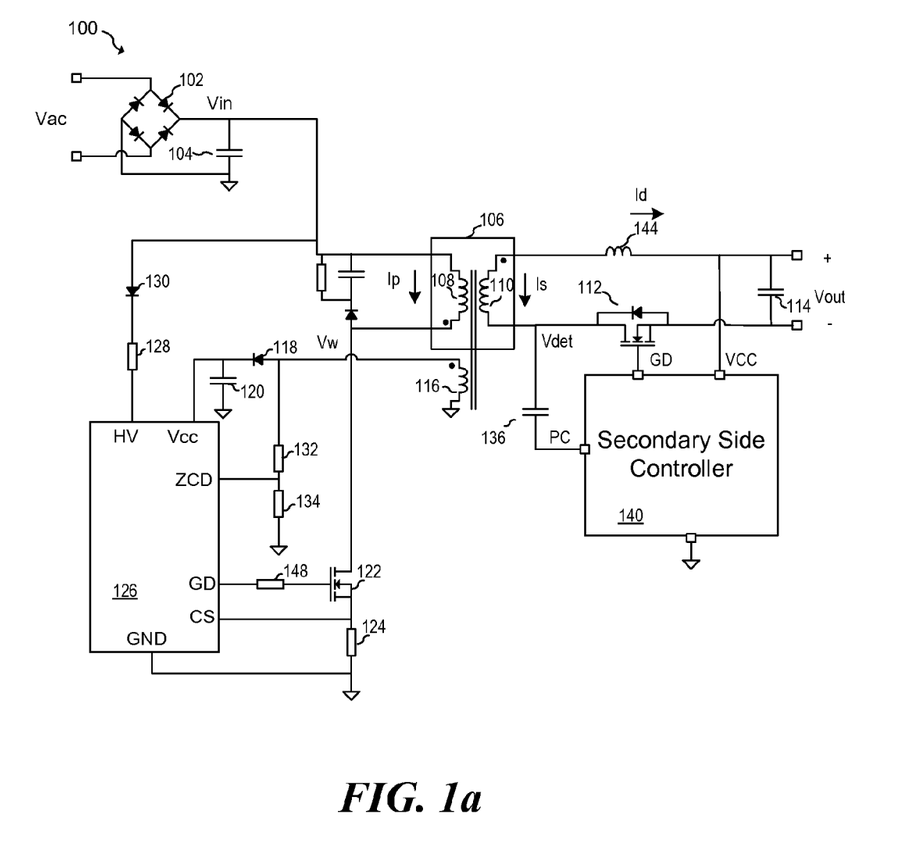
FIGS. 1a-c illustrate a schematic diagram of an embodiment flyback switched-mode power converter and an associated waveform diagrams.

FIG. 1a illustrates embodiment switched-mode flyback converter 100 that includes diode bridge rectifier 102, transformer 106, primary side switching transistor 122 controlled by controller 126 on the primary side, and switching transistor 112 controlled by secondary controller integrated circuit (IC) 140 on the secondary side. Diode bridge rectifier 102 converts AC voltage Vac, which may represent, for example, an AC mains voltage, to DC voltage Vin coupled to primary winding 108 of transformer 106. Residual ripple from the rectifying operation is filtered by input filter capacitor 104. The switching action of primary side switching transistor 122 magnetizes and demagnetizes primary winding 108 of transformer 106 to transfer power from primary winding 108 to secondary winding 110 with a DC output Vout. The output current at secondary winding 110 is rectified with secondary side switching transistor 112 controlled by secondary side controller IC 140, which together function as a synchronous rectifier.

As shown, secondary winding 110 does not have a feedback network coupled from the secondary side of transformer 106 to the primary side of transformer 106. Rather, switched-mode flyback converter 100 derives its feedback voltage by monitoring the voltage of auxiliary winding 116 that is magnetically coupled to transformer 106. This feedback voltage from auxiliary winding 116 is monitored by controller 126 at pin ZCD via a voltage divider implemented using resistors 132 and 134. In addition, controller 126 may perform a measurement of the primary side current by monitoring the voltage across current sensing resistor 124 coupled to the source of primary side switching transistor 122 at pin CS. Based on feedback taken from pins ZCD and CS, controller 126 produces a switching pattern at pin GD coupled to the gate of primary side switching transistor 122 via gate resistor 148 to maintain a generally stable output voltage and/or output current. During operation, power is provided to controller 126 via auxiliary winding 116, diode 118 and capacitor 120. During startup, controller 126 may receive power from voltage Vin via resistor 128 and diode 130. In an embodiment, the output voltage of embodiment switched-mode flyback converter 100 is filtered using a low pass filter that includes inductor 144 and output capacitor 114.

Secondary side controller IC 140 provides a switching signal to secondary side switching transistor 112 via pin GD to provide synchronous rectification and to provide communication from the secondary side of transformer 106 to the controller 126. In one embodiment, the state of secondary winding 110 is input to secondary side controller IC 140 via pin PC that is coupled to secondary winding 110 via capacitor 136.

Figure 1B:
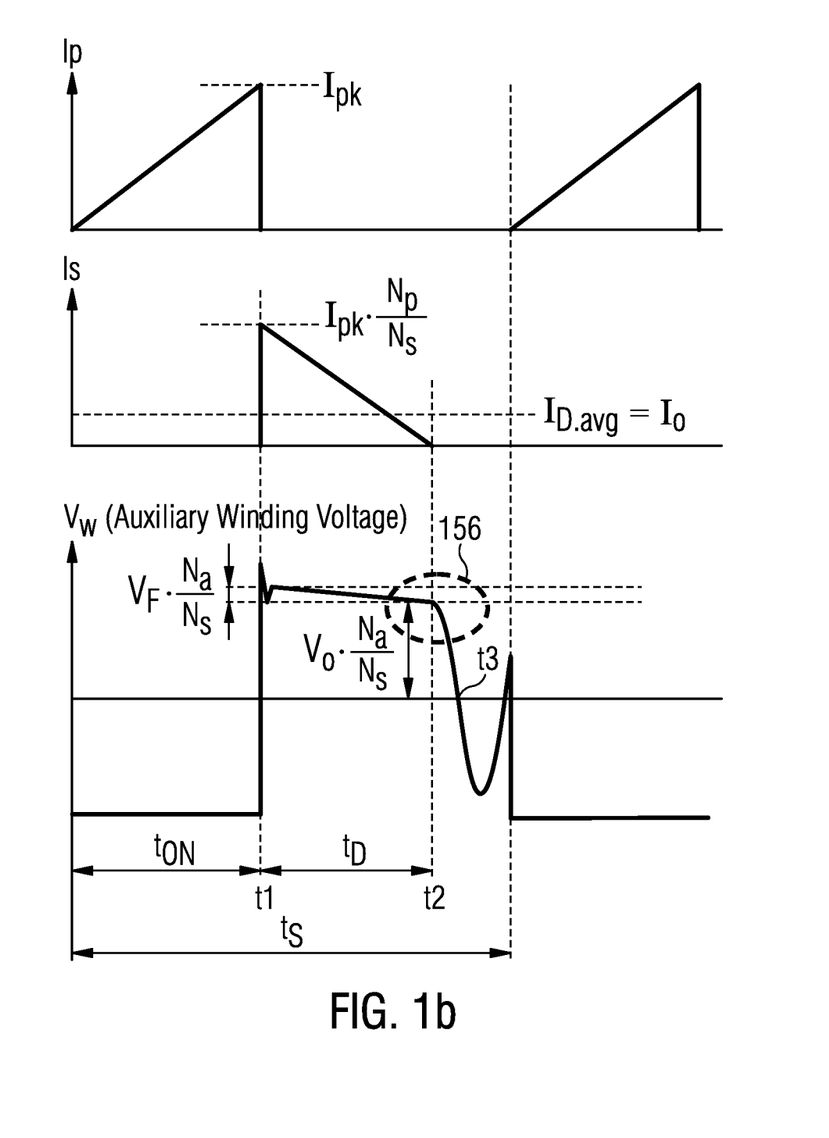

Referring to FIG. 1b, the primary winding current Ip increases when node GD activates primary side switching transistor 122, for example, during time $t_{on}$. The slope of the increase of the primary current IP when primary side switching transistor 122 is activated is substantially proportional to the voltage level of the input voltage Vin and substantially inversely proportional to the inductance L of the primary winding 108 and the transformer, respectively. That is:

$$dI\text{in}/dt = V\text{in}/L.$$

When primary side switching transistor 122 is activated, a voltage across primary winding 108 substantially corresponds to voltage Vin and a voltage across secondary winding 110 substantially corresponds to $-N22/N21 \cdot V\text{in}$, where N21 represents the number of windings of primary winding 108 and N22 represents the number of windings of secondary winding 110. As the voltage Vw across the secondary winding 110 is negative during on-period $t_{on}$, which is by virtue of the primary winding 108 and the secondary winding 110 having opposite winding senses, current Is through the secondary winding 110 is zero when primary side switching transistor 122 is activated.

When switching transistor 122 is deactivated, for example, at time t1, the voltage across the primary winding 108 and the voltage across the secondary winding 110 reverses polarity and increases until the voltage across the secondary winding 110 substantially corresponds to the output voltage Vout. When primary side switching transistor 122 is deactivated, primary winding 108 is demagnetized and transfers the energy that was inductively stored in the primary winding 108 to secondary winding 110 and to output Vout. As shown, primary current Ip decreases to zero at time t1 when primary side switching transistor 122 is shut off. Current Is through secondary winding 110, which was zero when primary side switching transistor 122 was active, sharply increases at time t1 and then starts to decrease.

By virtue of the inductive coupling between the auxiliary winding 116 and the primary winding 108, the voltage level of the auxiliary voltage Vw during the time that primary side switching transistor 122 is active (i.e., when driving voltage GD is high) substantially corresponds to $$Vw = N23/N21 \cdot V\text{in},$$

where N23 represents the number of windings of the auxiliary winding 116. When primary side switching transistor 122 is inactive, (i.e., when node GD is low), the voltage level of the auxiliary voltage Vaux substantially corresponds to $$V\text{aux} = N23/N22 \cdot V\text{out}$$

as long as the current Is through the secondary winding 110 has not decreased to zero. As the secondary side current Is decreases to zero, that is, as the transformer becomes completely demagnetized, the secondary side voltage and, consequently, the auxiliary winding voltage Vw becomes zero. Parasitic effects such as, for example, parasitic capacitances of the transformer may cause ringing or oscillations of the auxiliary voltage Vw, at the time when transformer 106 has become demagnetized, as shown in the plot of Vw starting at time t2. This ringing occurs because the synchronous rectifier on the secondary side of transformer 106 reverses polarity and presents an open circuit to secondary winding 110. As such, the impedance at the drain of primary side switching transistor 122 appears as a parallel resonance that includes the inductance of primary winding 108 in parallel with the capacitance coupled to the drain of the switching transistor.

Controller 126 may use this ringing phenomenon to determine when the secondary winding 110 has become demagnetized in order to perform a primary-side control of the output current. For example, by controlling the peak primary current Ip and the ratio of the time during which secondary winding 110 is discharging ($t_D$) to the total cycle time ($t_s$), the output current and/or output voltage to the power supply load is controllable. The onset of this ringing may be detected, for example, by detecting a zero crossing of auxiliary winding voltage Vw, or by detecting the knee point 156 of auxiliary winding voltage Vw.

In systems that do not utilize synchronous rectification, a diode is often used to rectify secondary current Is. In such cases, the output power of the secondary side is:

$$P_{seccondary} = (V_{FR} + V\text{out}) \ast Is,$$

where $P_{seccondary}$ is the output power of the secondary side, $V_{FR}$ is the forward diode voltage of the rectifying diode. This forward voltage of the rectifying diode represents a loss of power that results in a loss of efficiency. By turning secondary side switching transistor 112 on and off synchronously with the primary side switching transistor 122, the effective forward voltage of the rectifier may be made very low, for example, less than 0.1 V, thereby increasing the efficiency of the resulting power converter. In embodiments, switching transistors 112 and 122 may be implemented using a semiconductor switch, such as metal oxide semiconductor field-effect transistor (MOSFET), an insulated gate bipolar transistor (IGBT), power MOSFET, or the like.

Figure 1C:
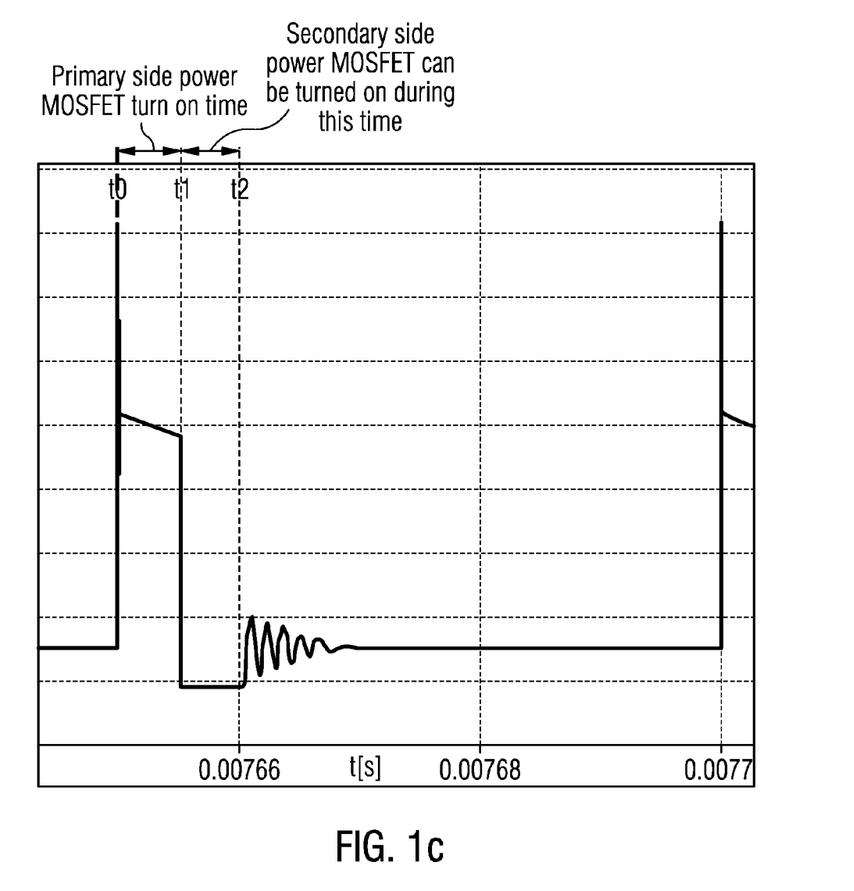

FIG. 1c illustrates an example waveform diagram of a secondary side winding voltage as primary side switching transistor 122 is turned on and off. When the primary side switching transistor 122 is turned ON at time t0, the secondary side winding voltage rises to a higher voltage. On the other hand, when primary side switching transistor 122 is turned off at time t1, the secondary winding voltage may drop, reverse its polarity and assume a voltage less than 0 V while the secondary winding is being demagnetized. Once the secondary winding has been demagnetized, for example at time t2, the secondary side winding voltage may experiences some ringing.

Figure 2:
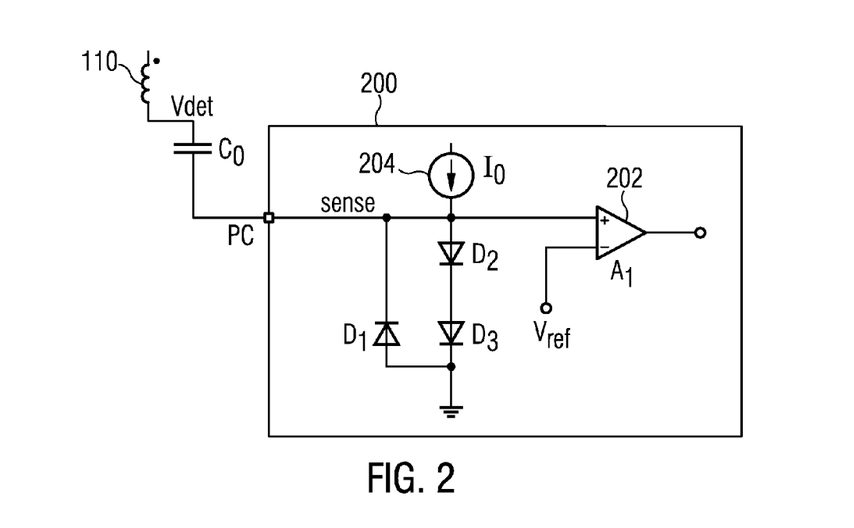
FIG. 2 illustrates a schematic of an embodiment sensor circuit.

FIG. 2 illustrates a schematic of an embodiment sensor circuit 200 used to detect rising and falling edges of the secondary side winding voltage. As shown, sensor circuit 200 includes comparator 202 having an input configured to be coupled to secondary winding 110 via capacitor $C_0$. In one embodiment, capacitor $C_0$ is an external capacitor that is coupled to comparator 202 via pin PC at the node labeled "sense." Alternatively, capacitor $C_0$ may be disposed on the same integrated circuit as comparator 202. The positive input of comparator 202 is biased with current source 204 and diodes $D_2$ and $D_3$ that produce a bias voltage about two diode drops or about 1.4V at room temperature, and the negative input of comparator 202 is coupled to voltage reference $V_{ref}$. Diodes $D_2$ and $D_3$ also function as a clamping circuit that clamps the sense node to about 1.4 V under transient conditions. Diode $D_1$ may be used to clamp the sense node to be above one diode drop or about −0.7V. It should be appreciated that in alternative embodiments, other bias and clamping networks known in the art may be used in place of current source 204 and diodes $D_1$, $D_2$ and $D_3$. For example, in some embodiments, greater or fewer than two diodes coupled in series may be used in place of diodes $D_2$ and $D_3$ and/or a plurality of diodes may be coupled in series in place of diode $D_1$.

During operation, secondary side winding voltage Vdet decreases causing external capacitor $C_0$ to be discharged, thereby causing the voltage at the sense node to drop. Hence, the disturbance at the sense node may be used to decide when to turn on and turn off secondary side switching transistor 112 in some embodiments.

Figure 3A:
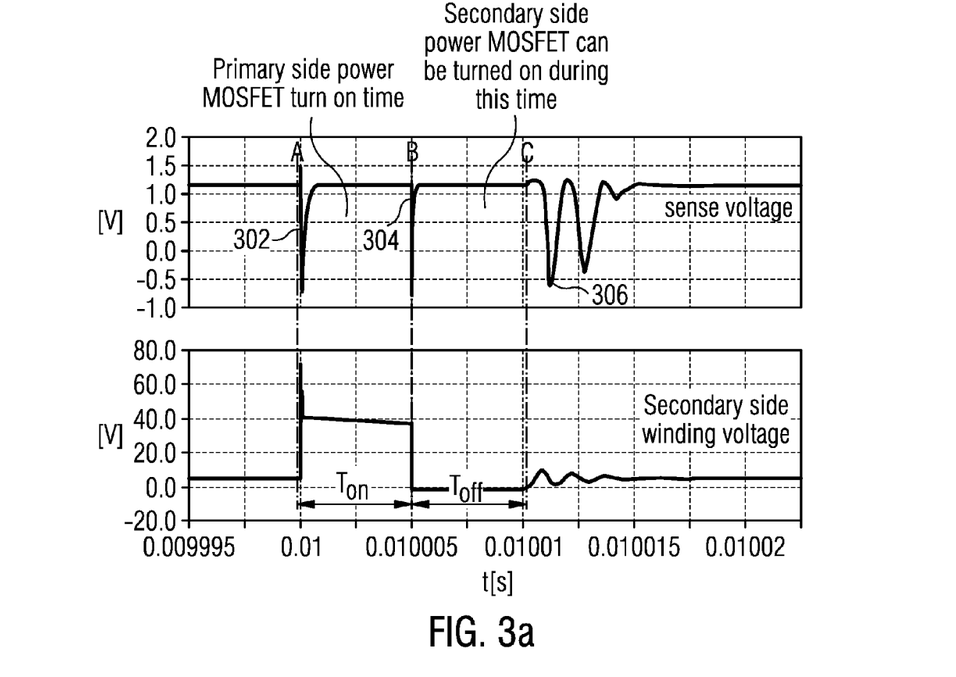
FIGS. 3a-c illustrate waveform diagram depicting the operation of an embodiment synchronous rectifier controller.
Figure 3B:
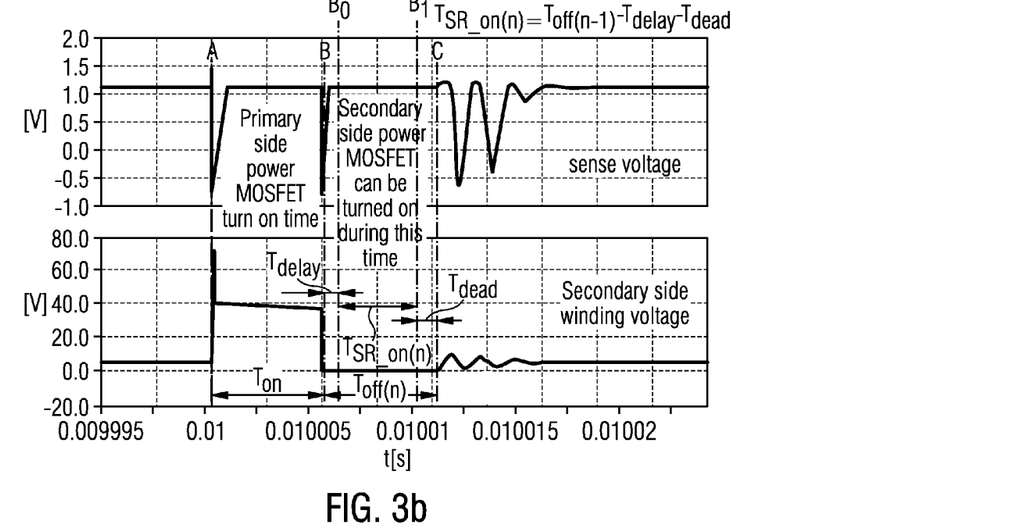
Figure 3C:
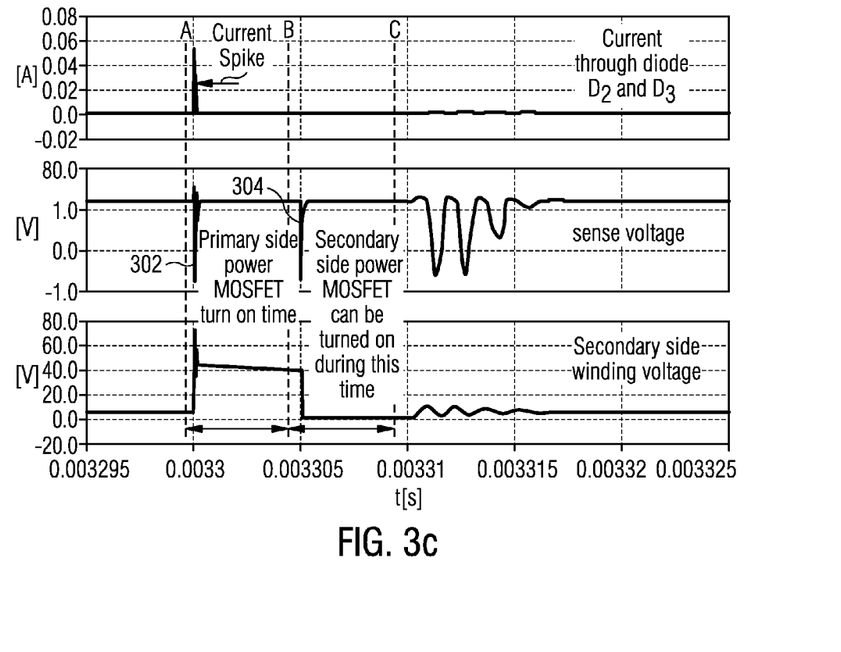

FIGS. 3a-c illustrate waveform diagrams that demonstrate the operation of an embodiment synchronous rectifier controller. As shown in FIG. 3a that illustrates waveforms representing the secondary winding voltage and the sense voltage at the input of comparator 202, when the primary side switching transistor 122 is turned ON at time A, there is a glitch 302 at the sense voltage due to ringing at the primary side. When the primary side switching transistor 122 is turned OFF at time B, there is another glitch 304 at the sense voltage due to the fast discharge of the secondary side winding voltage. When the secondary side current is discharged to zero (i.e., when the secondary winding is fully demagnetized) at time C, ringing 306 of the sense voltage is observed. This is due to ringing at the secondary side winding. Thus, in an embodiment, comparator 202 may be used to compare the sense voltage with a fixed voltage reference Vref to determine when primary side switching transistor 122 is being turned ON and OFF and when the secondary side current is discharged to zero current.

In an embodiment, these glitches detected by comparator 202 may be used to determine when to turn on and off secondary side switching transistor 112, as shown in the waveform diagram of FIG. 3b that depicts the sense voltage at the input of the comparator and secondary side winding voltage. For example, an embodiment controller may activate secondary side switching transistor 112 after time B when the voltage of the secondary side winding decreases, and turn off secondary side switching transistor 112 prior to time C when the secondary winding has been demagnetized. In some embodiments, secondary side switching transistor 112 may be turned on at time $B_0$ after a fixed delay $T_{delay}$ after time B and turned off at time $B_1$ at fixed dead time $T_{dead}$ prior to time C. The period of time during which secondary side switching transistor 112 is turned on is designated as $T_{SR\_on}(n)$.

In order to determine when to turn off secondary side switching transistor 112, an embodiment synchronous rectifier controller measures the time period $T_{off}(n-1)$ of a previous cycle, which is the demagnetization time of the secondary winding from time B to time C. For the next switching cycle, the secondary side switch is turned on at time $B_0$, which occurs a time $T_{delay}$ after time B and then turned off at a time interval $T_{dead}$ prior to the end of the previously measured demagnetization time. Hence, the length of time that secondary side switching transistor 112 is active for the $n^{th}$ cycle is:

$$T_{SR\_on}(n-1)=T_{off}(n-1)-T_{delay}-T_{dead}.$$

FIG. 3c illustrates a further waveform diagram representing the current through diodes $D_2$ and $D_3$, the sense voltage at the input of comparator 202, and the secondary winding voltage. As shown, glitches 302 and 304 both appear as falling voltages at both time A when primary side switching transistor 122 is turned on and at time B when the primary side switching transistor 122 is turned off. In an embodiment, the current through diodes $D_2$ and $D_3$ of the clamping circuit are used to differentiate the glitch 302 arising from turning on primary side switching transistor 122 from glitch 304 arising from turning off primary side switching transistor 122. As shown, at time A when primary side switching transistor 122 is turned on, there is a spike in the current through diodes $D_2$ and $D_3$ of the clamping circuit, while there is no spike in the current through diodes $D_2$ and $D_3$ of the clamping circuit at time B when primary side switching transistor 122 is turned off. During the rising edge of the secondary side winding voltage, the coupling of the transient voltage from the secondary side winding voltage causes the sense voltage to rise. In order to avoid the sense voltage from rising too high, the sense node is clamped to a certain voltage via diodes $D_2$ and $D_3$. Due to this clamping effect, a high current may flow through diodes $D_2$ and $D_3$ at point A.

During the falling edge of the secondary side winding voltage, however, the coupling of the transient voltage from the secondary side winding voltage causes the sense voltage to fall. As a result, there is little or no current flowing through diode $D_2$ and $D_3$ at time B. Therefore, in an embodiment, the current through diodes $D_2$ and $D_3$ are used to differentiate glitches 302 and 304. For example, the current through diodes $D_2$ and $D_3$ may be converted into a voltage and then compared to a fixed reference voltage. Alternatively, the current through diodes $D_2$ and $D_3$ may be mirrored and compared with a fixed current. In doing so, it is possible to detect that point A is the secondary side winding voltage rising edge and the point B is the falling edge. In some embodiments, the control signal to the gate of secondary side switching transistor 112 is inhibited when a current spike is detected in the clamping network, thus, secondary side switching transistor 112 may be turned on some delay $T_{delay}$ after time B.

Figure 4:
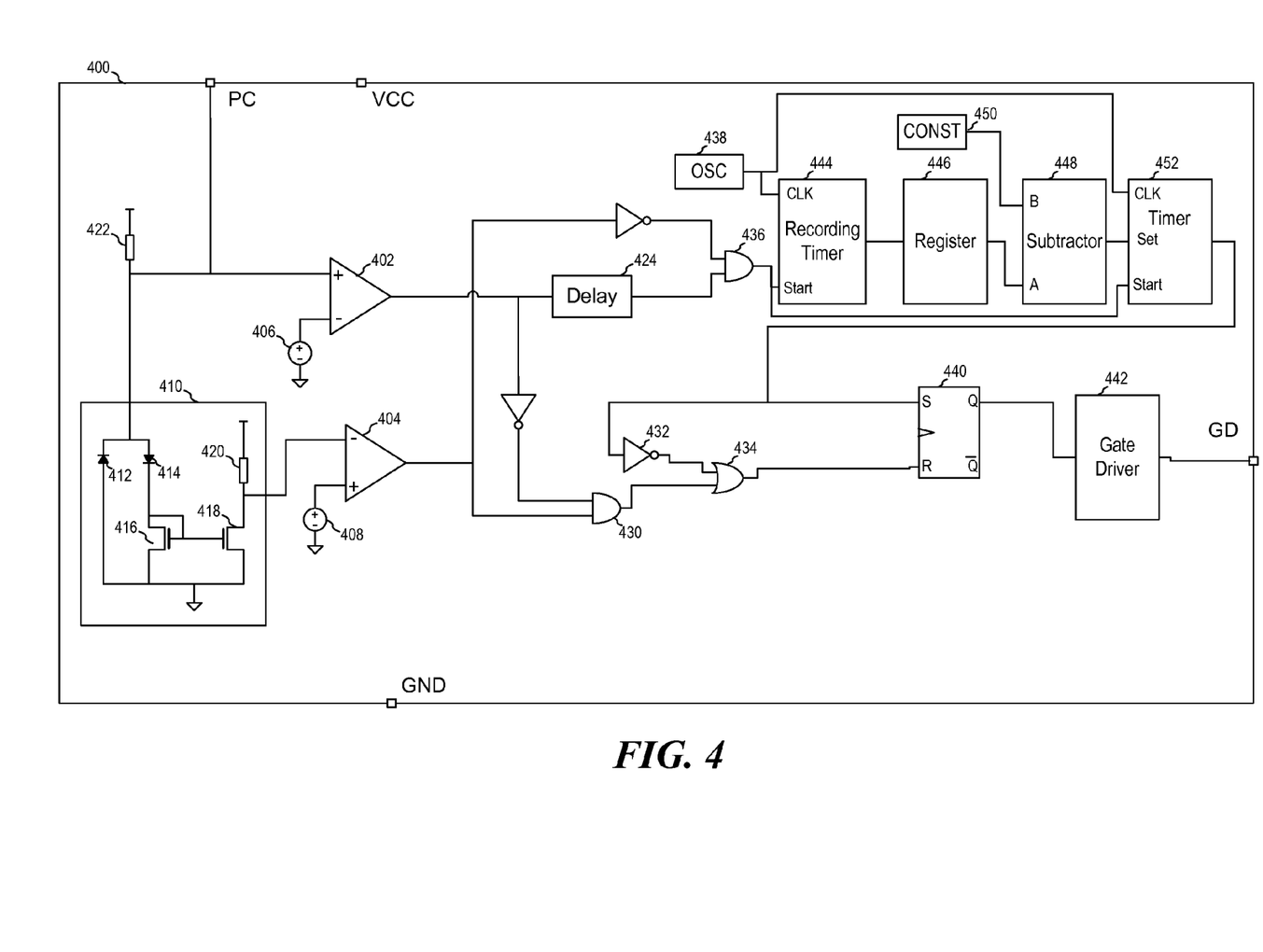
FIG. 4 illustrates an embodiment synchronous rectifier controller integrated circuit.

FIG. 4 illustrates synchronous rectifier controller integrated circuit (IC) 400 according to an embodiment of the present invention that may be used, for example, to implement secondary side controller IC 140 shown in FIG. 1a. Embodiment synchronous rectifier controller IC 400 includes terminal PC that is configured to be coupled to a secondary winding of a transformer via a capacitor and terminal GD that is configured to be coupled to a gate of a switch transistor coupled to the secondary winding of the transformer. Power to synchronous rectifier controller IC 400 is provided via terminals VCC and GND. In an embodiment, comparator 402 is coupled to terminal PC, the positive input of which is biased via resistor 422, and diode 414, and diode connected NMOS device 416 within clamping circuit 410. In addition to providing a bias voltage, diode 414 and diode connected NMOS device 416 also serve to clamp a positive going voltage to about 1.4 V in some embodiments, which prevent device breakdown and damage. Diode 412 is included to clamp the PC terminal to a negative voltage of about 0.7 V. It should be understood, however, that the exact clamping voltages depends on temperature and the particular device parameters of diode 412 and NMOS device 416.

Glitches of the secondary winding voltage are detected by comparator 402 that compares the voltage at pin PC with the voltage produced by reference voltage 406. In one embodiment, reference voltage 406 is about 1 V, however, other reference voltages may be used. In order to differentiate the rising edge of the secondary winding voltage from the falling edge of the secondary side winding voltage, the current through diode 414 and NMOS device 416 is detected by mirroring the current through NMOS device 416 to NMOS device 418, the drain of which is loaded by resistor 420 and the positive input of comparator 404. Comparator 404 compares the voltage at resistor 420 with reference voltage 408 to determine whether clamping circuit 410 is conducting current. In one embodiment, reference voltage 408 is about 0.3 volts less than Vcc. Alternatively, other reference voltages may be used. If a current is detected, the gate driving voltage at pin GD is made low via gate driver 442 by resetting SR latch 440 via AND gate 430 and OR gate 434, thus preventing the synchronous rectifier from conducting while the primary winding is magnetizing.

When comparator 402 detects a drop in voltage at the PC pin and the current through diode 414 is low, the voltage at the gate drive terminal GD is set high after a delay period determined by delay circuit 424 and the propagation delay of AND gate 436, timer 452, the set path of SR latch 440 and gate driver 442. In an embodiment, the delay of delay circuit 424 is set to ensure that the secondary side switching does not turn ON when the primary side switching transistor is still ON. In addition to the detection of the falling edge of the secondary winding voltage causing a rising edge at terminal GD, recording timer circuit 444 begins to record the time that is takes for the current of the secondary winding to go to zero (i.e., demagnetization time). Recording stops when another voltage drop is detected by comparator 402 at terminal PC. The recording output of recording timer circuit 444 is then transferred to register 446 and a constant value 450 is subtracted from the recording value by subtractor 448 to form a terminal count value for timer 452. Thus, when timer 452 is activated by comparator 402 via pin Start, timer 452 will count to the terminal count formed by the subtracted value. This subtracted value may correspond, for example, to dead time $T_{dead}$ described above with respect to FIG. 3b that prevents the secondary side switching transistor from being shut off too late in some embodiments. When timer 452 reaches its terminal count, the output of timer 452 goes low and resets SR latch 440 via inverter 432 and OR gate 424 and turns off the secondary side switching transistor via gate driver 442.

In an embodiment, recording timer circuit 444 and timer 452 may be implemented using digital counters according to circuits and methods known in the art. In an embodiment, clock generator 438 produces a clock for recording timer circuit 444 and timer 452. In one embodiment, the clock is set to about 33 MHz, however, any suitable frequency may be used depending on the particular embodiment and its specifications.

It should be understood that the circuits depicted in FIG. 4 may be implemented using circuits and methods known in the art. In alternative embodiments, other logically and/or functionally similar circuits may be used in place of those shown in FIG. 4. In embodiments, all of the components depicted within embodiment synchronous rectifier controller IC 400 may be disposed on a single integrated circuit or may be disposed on multiple integrated circuits. For example, gate driver 442 may be disposed on the same integrated circuit as the rest of the controller or may be implemented using an external driver.

Figure 5A:
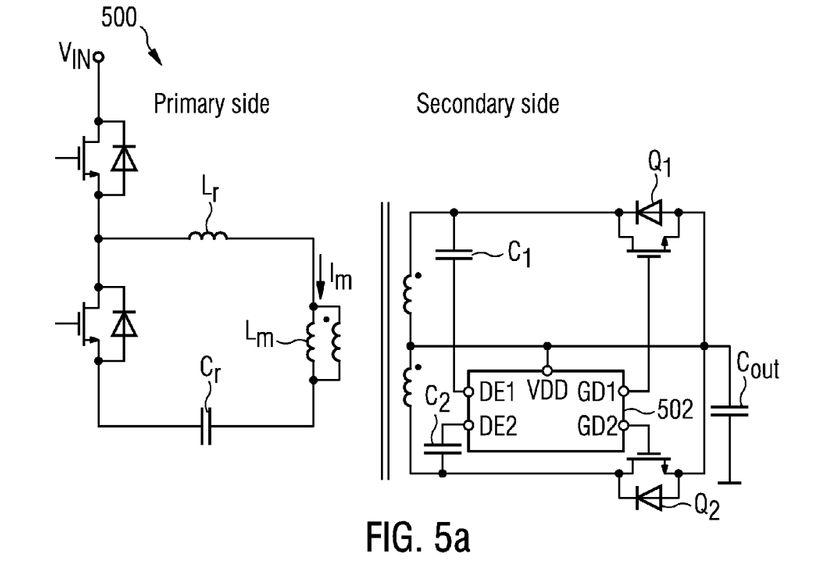
FIGS. 5a-b illustrate an embodiment resonant power converter and an associated waveform diagram.

FIG. 5a illustrates embodiment resonant converter 500 according to a LLC resonant topology that includes synchronous rectifier controller 502 coupled to synchronous rectifier switching transistors $Q_1$ and $Q_2$. External capacitors $C_1$ and $C_2$ are used to determine when synchronous rectifier switching transistors $Q_1$ and $Q_2$.

Figure 5B:
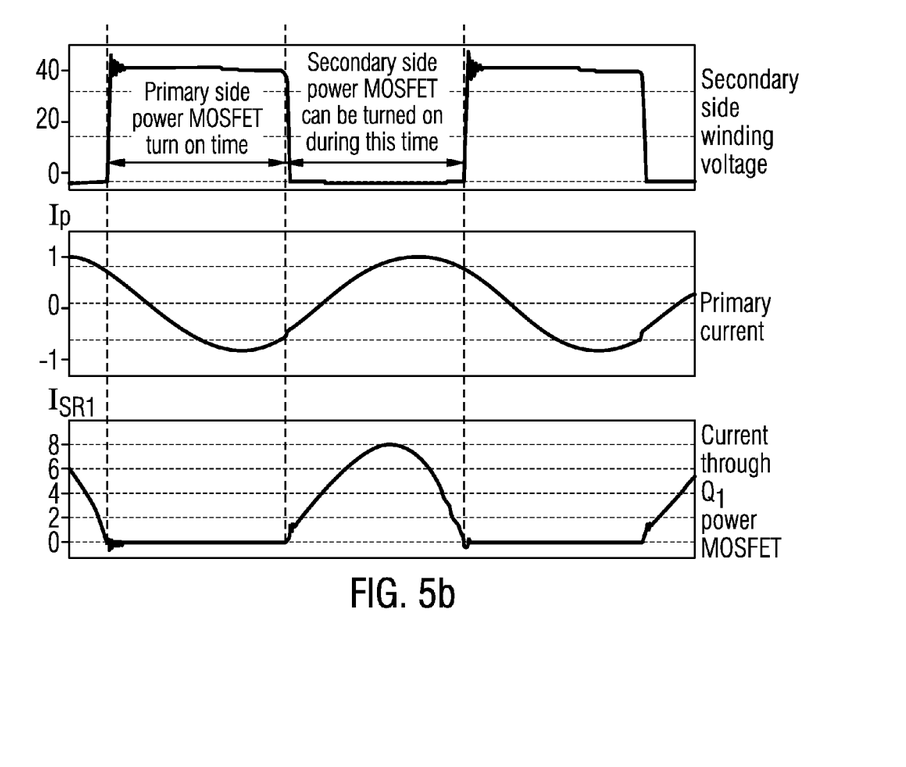

FIG. 5b illustrates a waveform diagram showing the secondary side winding voltage, the current in the primary winding and the current through switching transistor Q1. From the waveforms of FIG. 5b, it is apparent that the secondary side winding voltage waveform for LLC topology is similar to secondary side winding voltage waveform for flyback topology discussed above. One difference is, however, that the secondary side winding voltage is switched high when the secondary side current is discharged to zero. Thus, the same general methods and techniques described above with respect to flyback converter topologies may also be applied to the resonant topologies.

Figure 6:
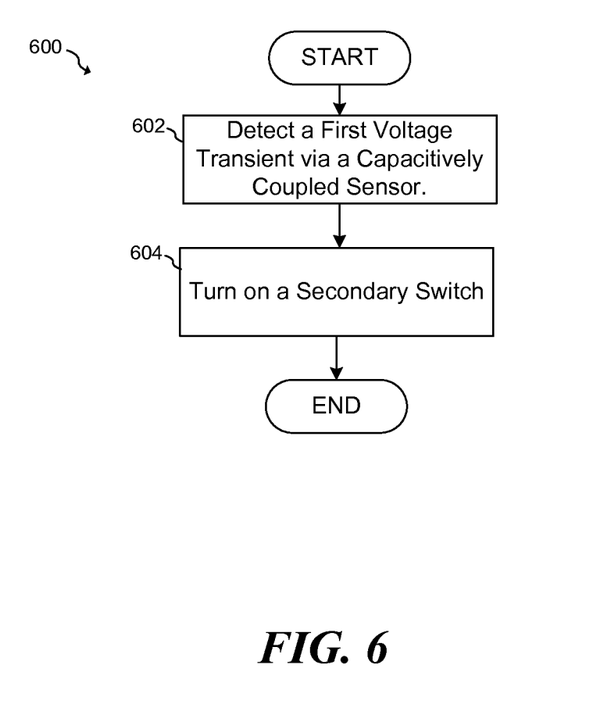
FIG. 6 illustrates a flowchart of an embodiment method.

FIG. 6 illustrates a flowchart of an embodiment method 600. In step 602, a voltage decrease in a secondary winding of a transformer in a switched-mode power converter is detected by detecting a first voltage transient. In an embodiment, this voltage transient is detected using a sensor, such as a comparator, that is capacitively coupled to the secondary winding of a transformer. Next, in step 604, a secondary switch coupled to the secondary winding of the transformer is turned on based on when the first voltage transient is detected.

In accordance with an embodiment, a method of operating a switched-mode power supply includes detecting a voltage decrease in a secondary winding of a transformer by detecting a first voltage transient using a sensor capacitively coupled to the secondary winding of the transformer; and turning on a secondary switch coupled to the secondary winding of the transformer based on when the first voltage transient is detected.

The method may further include detecting a voltage increase in the secondary winding by detecting a second voltage transient using the sensor, and by detecting a current transient through a clamping circuit coupled to an input of the sensor. The secondary switch is inhibited when the second voltage transient and the current transient are detected. Detecting the first voltage transient may include monitoring an output of a comparator coupled to a capacitor that is coupled to the secondary winding of the transformer.

In an embodiment, the method further includes detecting a demagnetization of the secondary winding comprising by a third voltage transient using the sensor. The method may further include determining a demagnetization time of the secondary winding by measuring a first time period between the first voltage transient and the third voltage transient. Moreover, measuring the first time period may include starting a counter when the first voltage transient is detected and stopping the counter when the third voltage transient is detected. The method may further include determining a turn-off time of the secondary switch based on the first time period. More specifically, determining the turn-off time of the secondary switch based on the first time period includes subtracting a second time period from the first time period in some embodiments. The second time period may include a dead zone between when the secondary switch is turned off and when a primary switch coupled to a primary winding of the transformer is turned on.

In an embodiment, the method further includes turning on the secondary switch after waiting a first delay after the first voltage transient is detected. The method may further include detecting a demagnetization of the secondary winding by detecting a third voltage transient using the sensor; detecting a demagnetization time of the secondary winding by measuring a first time period between the first voltage transient and the third voltage transient; and determining a turn-off time of the secondary switch based on the first time period by subtracting a second time period from the first time period. In an embodiment, measuring the first time period comprises starting a counter when the first voltage transient is detected and stopping the counter when the third voltage transient is detected, and subtracting the second time period from the first time period comprises subtracting a fixed number from the counter.

In accordance with a further embodiment, a circuit includes a synchronous rectifier controller. The synchronous rectifier controller includes a sensor circuit having an input terminal configured to be capacitively coupled to a secondary winding of a transformer and configured to detect a first voltage transient. The synchronous rectifier controller also includes a control logic circuit coupled to an output of the sensor circuit that is configured to assert a switch activation signal based on when the first voltage transient is detected, and a switch driver circuit configured to be coupled to a secondary switch connected to the secondary winding.

In an embodiment, the circuit further includes a capacitor coupled between the secondary winding and the input terminal. The circuit may also include the transformer and the secondary switch coupled to the secondary winding of the transformer. The circuit may be implemented as at least one of a flyback converter and a resonant converter.

The synchronous rectifier may further include a voltage clamping circuit coupled to the input terminal, and a current detector coupled to the voltage clamping circuit. The control logic circuit is configured to inhibit the switch activation signal when the sensor detects a second voltage transient at a same time that that the current detector detects a current transient. The control logic is further configured to determine a demagnetization time of the secondary winding by measuring a first time period between the first voltage transient and a third voltage transient detected by the sensor circuit. The control logic may include a first counter configured to be started when the first voltage transient is detected and configured to be stopped when the third voltage transient is detected. In some embodiments, the control logic further includes a second counter coupled to the first counter, the second counter is configured to load a first value based on a terminal count of the first counter of a previous cycle, and the second counter is configured to be started when the first voltage transient is detected and to be stopped when the second counter counts the first value. In an embodiment, the circuit further includes a subtraction circuit coupled between the first counter and the second counter. The subtraction circuit configured to provide the first value by subtracting a second value from an output of the first counter.

In an embodiment, the control logic is configured to assert the switch activation signal a first delay time after the first voltage transient is detected, measure a demagnetization time of the secondary winding of a previous cycle, and de-assert the switch activation signal before a first time period after the switch activation signal is asserted, such that the first time period is less than the measured demagnetization time of the secondary winding of a previous cycle. In some embodiments, the sensor circuit, control logic circuit and the switch driver circuit are disposed on an integrated circuit.

In accordance with another embodiment, a synchronous rectifier integrated circuit includes a first comparator having an input coupled to a sensing terminal, a timing circuit coupled to an output of the first comparator, and a switch activation circuit having an input coupled to an output of the timing circuit. The sensing terminal is configured to be capacitively coupled to a secondary winding of a transformer, and the timing circuit is configured to measure a first time period between a first voltage transient detected by the first comparator and a second voltage transient detected by the first comparator. The switch activation circuit has an output coupled to a switch activation terminal configured to be coupled to a control node of a switch coupled to the secondary winding. In an embodiment, the switch activation circuit is configured to close the switch based on when the first voltage transient is detected by the first comparator and to open the switch based on the first time period.

The synchronous rectifier integrated circuit may further include a clamping circuit coupled to the sensing terminal, and a current sensor coupled to the clamping circuit and to the switch activation circuit. The switch activation circuit is configured to deactivate the switch when the current sensor detects a current at a same time that the first comparator detects a voltage transient. The clamping circuit may include a diode, and the current sensor may include a current mirror having an input terminal coupled to the diode and a comparator having an input node coupled to an output of the current mirror.

In some embodiments, the switch activation circuit includes a latch coupled to an output of the timing circuit. The timing circuit may include a first counter coupled an output of the first comparator, and a second counter having an input coupled to an output of the first counter and an output coupled to the switch activation circuit. The timing circuit may further include a subtraction circuit coupled between the first counter and the second counter, the subtraction circuit configured to subtract a contact value from the first counter.

In accordance with a further embodiment, a switched-mode power supply includes a transformer, a secondary side switch coupled to a secondary winding of the transformer and a secondary side controller that includes an activation terminal coupled to a control node of the secondary side switch, a sensor circuit coupled to a sensing terminal, and a control circuit configured to assert an activation signal at the activation terminal in response to a first transient detected at the activation terminal. The switched-mode power supply further includes a capacitor coupled between the secondary winding of the transformer and a sensing terminal of the secondary side controller.

In an embodiment, the secondary side controller further comprises a clamping circuit coupled the sensing terminal, and a current sensor configured to detect a current through the clamping circuit, and the control circuit is further configured to inhibit the activation signal when the sensor detects a second transient and the current sensor detects a current transient at a same time. The switched mode power supply may include, for example, a flyback converter and/or a resonant converter.

Advantages of some embodiments include the ability to perform secondary side synchronous rectification using a single capacitive component coupled between the secondary side winding and the secondary side controller in the case of a flyback converter or two capacitors in the case of the LLC resonant circuit. The use of a single capacitor is advantageous in that it consumes less board space and may have a lower bill of materials (BOM) cost than synchronous rectifier circuits that use multiple external components to interface between the secondary winding and the synchronous rectifier controller. Moreover, having a reduced number of interface components also reduces the pin count of the synchronous rectifier controller and may reduce the production cost of the synchronous rectifier controller. Further cost savings and increased reliability may be achieved since a capacitively coupled sensor may be implemented without higher voltage devices.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a switched-mode power supply, the method comprising:
   detecting a voltage decrease in a secondary winding of a transformer comprising detecting a first voltage transient using a sensor capacitively coupled to a node between the secondary winding of the transformer and a secondary switch coupled to the secondary winding; and
   turning on the secondary switch based on when the first voltage transient is detected;
   detecting a voltage increase in the secondary winding comprising detecting a second voltage transient using the sensor, and detecting a current transient through a clamping circuit coupled to an input of the sensor; and
   inhibiting the secondary switch when the second voltage transient and the current transient are detected.

2. The method of claim 1, wherein detecting the first voltage transient comprises monitoring an output of a comparator coupled to a capacitor that is coupled to the secondary winding of the transformer.

3. The method of claim 1, wherein turning on the secondary switch comprises turning on the secondary switch after waiting a first delay after the first voltage transient is detected.

4. The method of claim 3, further comprising:
   detecting a demagnetization of the secondary winding comprising detecting a third voltage transient using the sensor;
   detecting a demagnetization time of the secondary winding comprising measuring a first time period between the first voltage transient and the third voltage transient; and
   determining a turn-off time of the secondary switch based on the first time period, wherein determining the turn-off time of the secondary switch based on the first time period comprises subtracting a second time period from the first time period.

5. The method of claim 4, wherein:
   measuring the first time period comprises starting a counter when the first voltage transient is detected and stopping the counter when the third voltage transient is detected; and
   subtracting the second time period from the first time period comprises subtracting a fixed number from the counter.

6. A method of operating a switched-mode power supply, the method comprising:
   detecting a voltage decrease in a secondary winding of a transformer comprising detecting a first voltage transient using a sensor capacitively coupled to a node between the secondary winding of the transformer and a secondary switch coupled to the secondary winding;
   turning on the secondary switch based on when the first voltage transient is detected; and
   detecting a demagnetization of the secondary winding comprising detecting a third voltage transient using the sensor.

7. The method of claim 6, further comprising determining a demagnetization time of the secondary winding comprising measuring a first time period between the first voltage transient and the third voltage transient.

8. The method of claim 7, wherein measuring the first time period comprises starting a counter when the first voltage transient is detected and stopping the counter when the third voltage transient is detected.

9. The method of claim 7, wherein the method further comprises determining a turn-off time of the secondary switch based on the first time period.

10. The method of claim 9, wherein determining the turn-off time of the secondary switch based on the first time period comprises subtracting a second time period from the first time period.

11. The method of claim 10, wherein the second time period comprises a dead zone between when the secondary switch is turned off and when a primary switch coupled to a primary winding of the transformer is turned on.

12. A circuit comprising:
   a synchronous rectifier controller including
      a sensor circuit comprising an input terminal configured to be capacitively coupled to a node between a secondary winding of a transformer and a secondary switch connected to the secondary winding and configured to detect a first voltage transient,
      a control logic circuit coupled to an output of the sensor circuit, the control logic circuit configured to assert a switch activation signal based on when the first voltage transient is detected,
      a switch driver circuit configured to be coupled to the secondary switch,
      a voltage clamping circuit coupled to the input terminal, and
      a current detector coupled to the voltage clamping circuit, wherein the control logic circuit is configured to inhibit the switch activation signal when the sensor circuit detects a second voltage transient at a same time that the current detector detects a current transient.

13. The circuit of claim 12, further comprising a capacitor coupled between the secondary winding and the input terminal.

14. The circuit of claim 13, further comprising the transformer and the secondary switch coupled to the secondary winding of the transformer.

15. The circuit of claim 14, wherein the circuit comprises at least one of a flyback converter and a resonant converter.

16. The circuit of claim 12, wherein the control logic circuit is configured to:
    assert the switch activation signal a first delay time after the first voltage transient is detected;
    measure a demagnetization time of the secondary winding of a previous cycle; and
    de-assert the switch activation signal before a first time period after the switch activation signal is asserted, wherein the first time period is less than the measured demagnetization time of the secondary winding of a previous cycle.

17. The circuit of claim 12, wherein the sensor circuit, control logic circuit and the switch driver circuit are disposed on an integrated circuit.

18. A circuit comprising:
    a synchronous rectifier controller including
        a sensor circuit comprising an input terminal configured to be capacitively coupled to a node between a secondary winding of a transformer and a secondary switch connected to the secondary winding and configured to detect a first voltage transient,
        a control logic circuit coupled to an output of the sensor circuit, the control logic circuit configured to assert a switch activation signal based on when the first voltage transient is detected, and
        a switch driver circuit configured to be coupled to the secondary switch, wherein the control logic circuit is further configured to determine a demagnetization time of the secondary winding by measuring a first time period between the first voltage transient and a third voltage transient detected by the sensor circuit.

19. The circuit of claim 18, wherein the control logic circuit comprises a first counter configured to be started when the first voltage transient is detected and configured to be stopped when the third voltage transient is detected.

20. The circuit of claim 19, wherein:
    the control logic circuit further comprises a second counter coupled to the first counter;
    the second counter is configured to load a first value based on a terminal count of the first counter of a previous cycle; and
    the second counter is configured to be started when the first voltage transient is detected and to be stopped when the second counter counts the first value.

21. The circuit of claim 20, further comprising a subtraction circuit coupled between the first counter and the second counter, the subtraction circuit configured to provide the first value by subtracting a second value from an output of the first counter.

22. A synchronous rectifier integrated circuit comprising:
    a first comparator having an input coupled to a sensing terminal, the sensing terminal configured to be capacitively coupled to a secondary winding of a transformer;
    a timing circuit coupled to an output of the first comparator, the timing circuit configured to measure a first time period between a first voltage transient detected by the first comparator and a second voltage transient detected by the first comparator; and
    a switch activation circuit having an input coupled to an output of the timing circuit and an output coupled to a switch activation terminal configured to be coupled to a control node of a switch coupled to the secondary winding.

23. The synchronous rectifier integrated circuit of claim 22, wherein the switch activation circuit is configured to close the switch based on when the first voltage transient is detected by the first comparator and to open the switch based on the first time period.

24. The synchronous rectifier integrated circuit of claim 22, further comprising:
    a clamping circuit coupled to the sensing terminal; and
    a current sensor coupled to the clamping circuit and to the switch activation circuit, wherein the switch activation circuit is configured to deactivate the switch when the current sensor detects a current at a same time that the first comparator detects a voltage transient.

25. The synchronous rectifier integrated circuit of claim 24, wherein:
    the clamping circuit comprises a diode; and
    the current sensor comprises a current mirror having an input terminal coupled to the diode and a comparator having an input node coupled to an output of the current mirror.

* * * * *